FRANK SCHWOERER

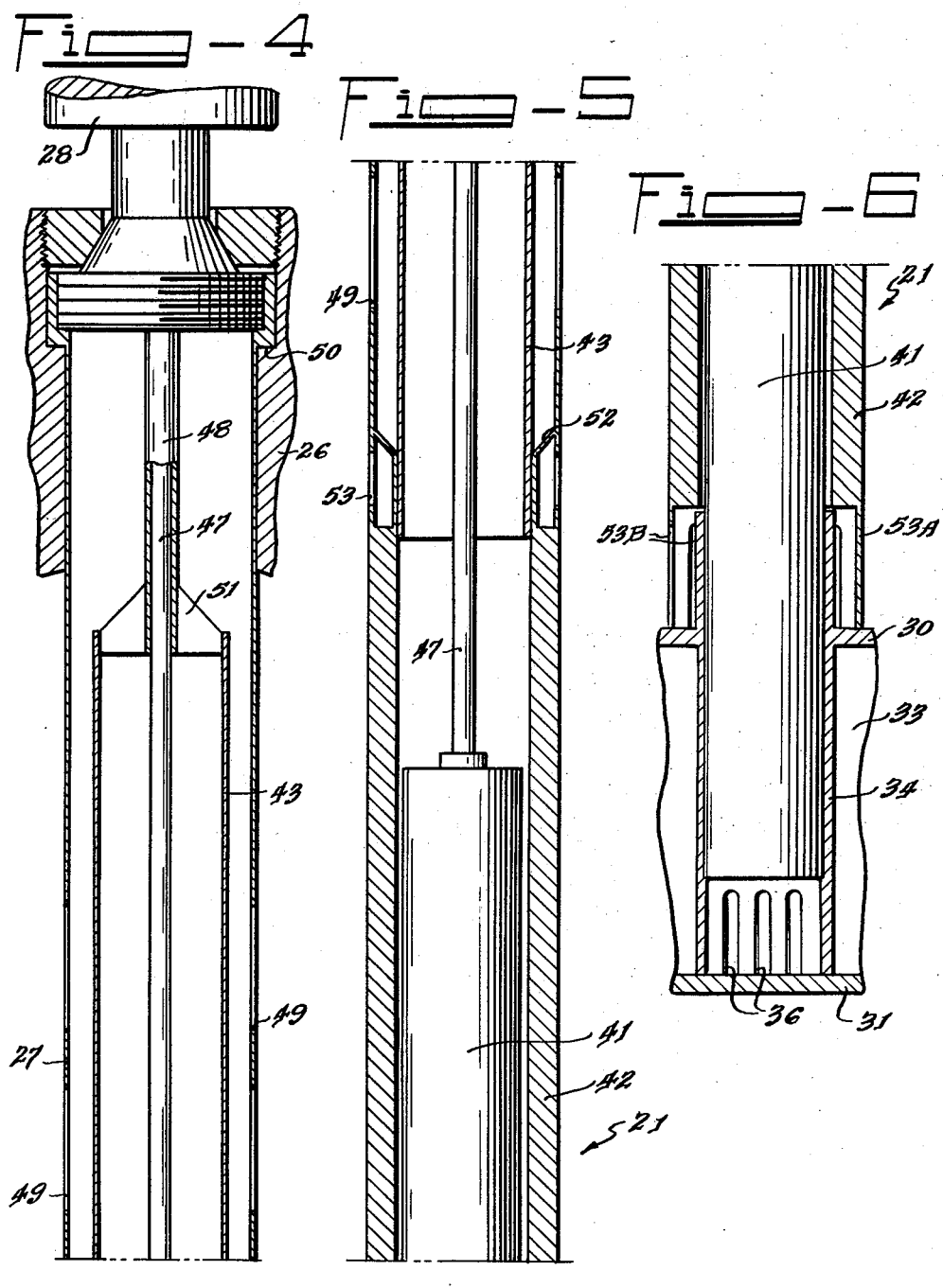

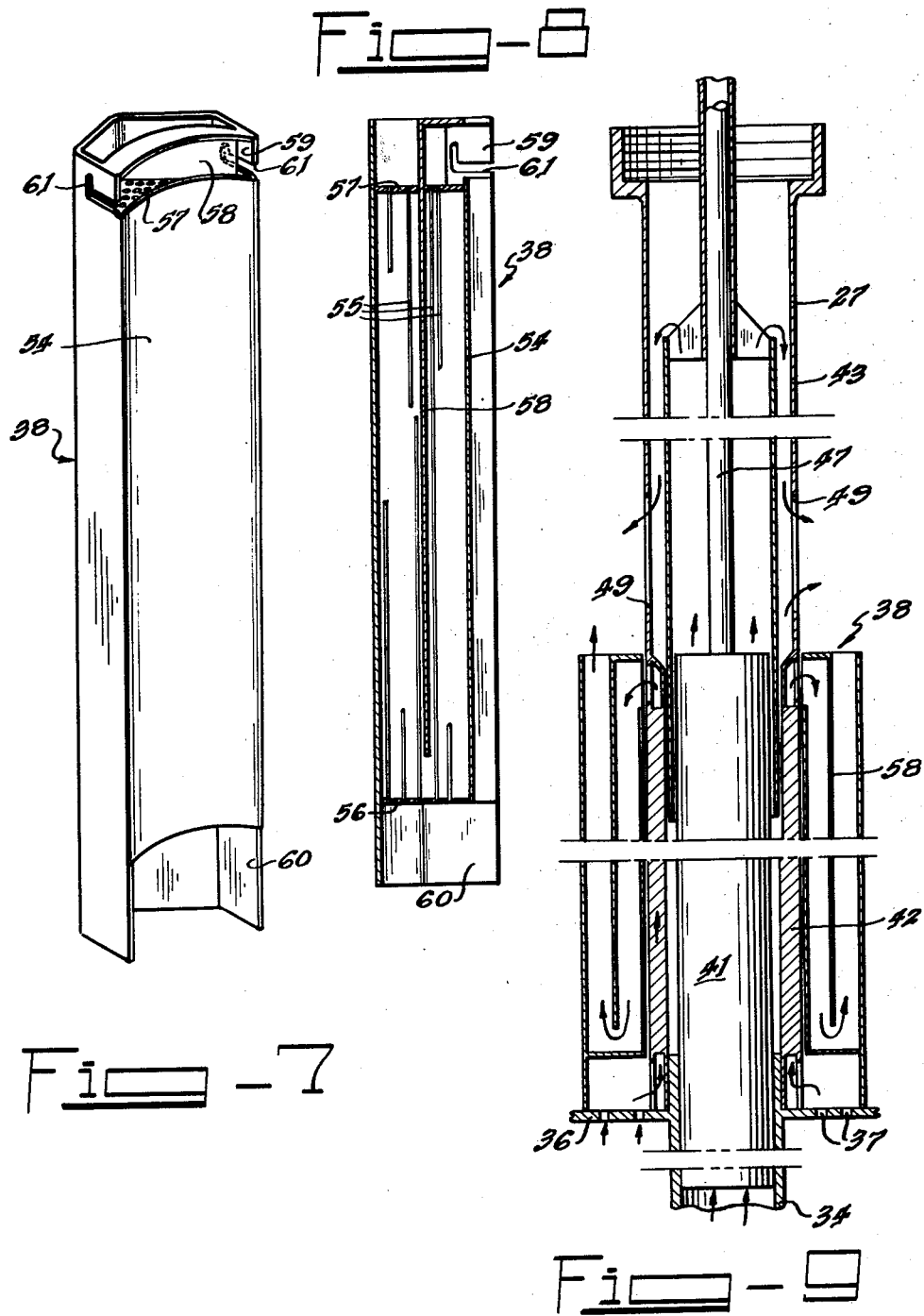

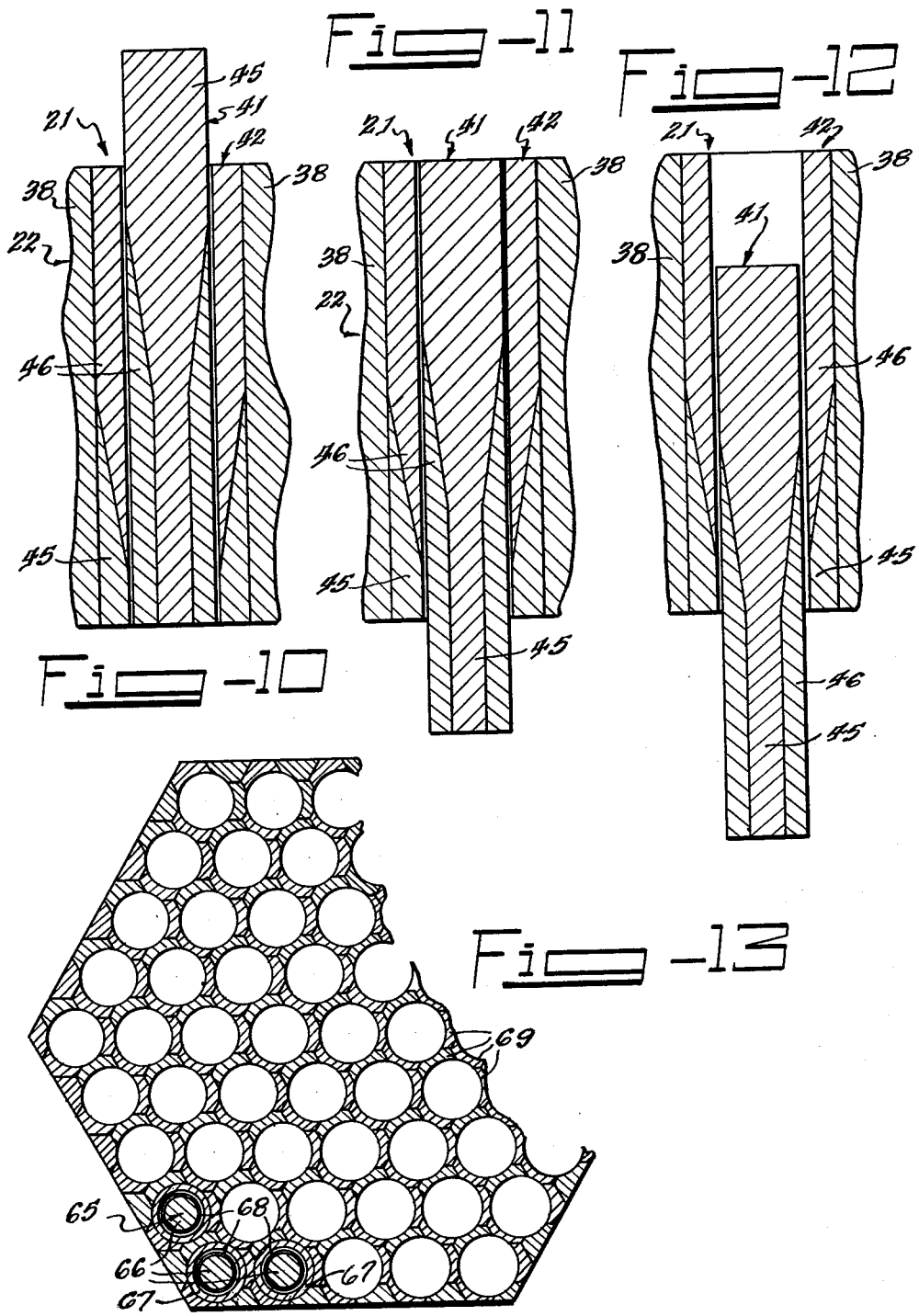

United States Patent Office 3,151,029
Patented Sept. 29, 1964

3,151,029
CORE ASSEMBLY FOR A NUCLEAR REACTOR
Frank Schwoerer, Mount Lebanon, Pa., assignor, by mesne assignments, to the United States of America as represented by the United States Atomic Energy Commission
Filed Nov. 15, 1963, Ser. No. 324,140
4 Claims. (Cl. 176—17)

This invention relates to a nuclear reactor designed to be used as a source of heat in a central station power plant. In more detail the invention relates to a large pressurized water reactor having a long lifetime which incorporates a blanket of fertile material which furnishes a substantial fraction of core power.

Reactor designers have two ultimate objectives in view: to bring down the cost of nuclear power until it is competitive with power from fossil fuels, and to utilize to the fullest extent possible available nuclear resources. These objectives are to some extent mutually inconsistent since at the present time reactors producing power at the lowest possible cost do not make the fullest utilization possible of fuel resources.

The seed and blanket concept utilized in the Shippingport Pressurized Water Reactor represents a compromise by which relatively good fuel resource utilization and fairly good economy are attained. The seed and blanket concept consists of surrounding seeds of highly enriched fissionable material with a blanket of fertile material. This arrangement has the following major benefits:

(1) Low fuel inventory requirement resulting from the separation of the neutron-absorbing fertile material from the small volume, reactivity-controlling seeds.

(2) Generation of relatively large amounts of power from a fertile material in a light water reactor.

(3) Ability to burn in place most of the fissionable material which is produced in the long-lived blanket or to produce and accumulate large amounts of fissionable material in the blanket for recycle purposes.

(4) Minimum dependence of energy costs on the economics of fuel reprocessing.

(5) Reduced plant outage for refueling and lower costs of shipping expended fuel.

(6) Ability to achieve reactivity control without the use of absorbers or expensive heavy water.

Reactors of the seed-blanket type may be designed with two basically distinct objectives in mind: (a) a converter-burner design in which the objective is to convert to fissionable material and burn in place as large a fraction as practical of the fertile material and (b) a converter-recycle design in which the objective is to convert to fissionable material and accumulate for recycle purposes as large a fraction as practical of the fertile material. The converter-burner design has the advantage of reduced fuel reprocessing costs whereas the converter-recycle design has the advantage of increased utilization of fertile material.

Obviously the more important immediate objective of reactor designers is to produce power economically. Since the cost of reprocessing irradiated fertile material to obtain the fissionable material produced therein represents an important part of the cost of nuclear power, minimizing this cost while holding other costs equal will result in more economical power. The other ultimate objective—good fuel resource utilizatiozn—is also of course of tremendous importance and must be considered in every design.

It is accordingly an object of the present invention to develop a nuclear reactor producing power at low cost while making reasonably good utilization of nuclear fuel resources.

It is also an object of the present invention to develop a nuclear reactor of the seed and blanket type having a very long lifetime.

It is a further object of the present invention to develop a control system for a reactor which does not employ neutron poisons thereby giving good neutron economy.

It is another object of the present invention to develop a novel arrangement of fuel and blanket elements which results in good neutron economy and easy assembly and disassembly.

It is also an object of the present invention to develop a novel fuel module for such a reactor.

One more object of the present invention is to develop a method of controlling a nuclear reactor to attain maximum neutron economy.

The reactor will first be described in general terms and then will be described specifically.

The reactor contains a seed and blanket core containing a fissionable isotope as the seed material and a fertile material which contains a lower amount of a fissionable isotope than does natural uranium as the blanket material. The fissionable material may be $U^{235}$ or $U^{233}$ and the fertile material may be $U^{238}$ or $Th^{232}$. A plurality of seed cores each consisting of an outer annular fixed core section, an inner cylindrical movable core section, and an anular safety element disposed for longitudinal movement between the fixed and movable core sections are each surrounded by three chevron-shaped blanket elements and each such core is independently critical.

Control of the reactor is obtained by moving the inner cylindrical core section thus changing the geometry of the reactor and thereby changing the leakage of neutrons from the relatively small seed region into the subcritical blanket region. By eliminating neutron absorbers from the core during operation of the reactor, the neutron economy of the reactor is enhanced.

The invention will next be described with reference to the accompanying drawings wherein:

FIG. 4 is a vertical sectional view of the upper portion of a seed core.

FIG. 5, forming a continuation of FIG. 4, is a vertical sectional view of the intermediate portion of a seed core.

FIG. 6, forming a continuation of FIG. 5, is a vertical sectional view of the lower portion of a seed core.

FIG. 7 is a perspective view of a chevron-blanket segment.

FIG. 8 is a vertical sectional view through said blanket segment.

FIG. 9 is a coolant flow diagram for the reactor.

FIG. 10 is a diagrammatic view of a seed core showing the movable portion of the core in its most reactive position.

FIG. 11 is a diagrammatic view of a seed core showing the movable portion of the core in the hot shut-down position.

FIG. 12 is a diagrammatic view of a seed core showing the movable portion of the core in its least reactive position.

FIG. 13 is a partial diagrammatic horizontal sectional view of a modified reactor core.

Figure 1:
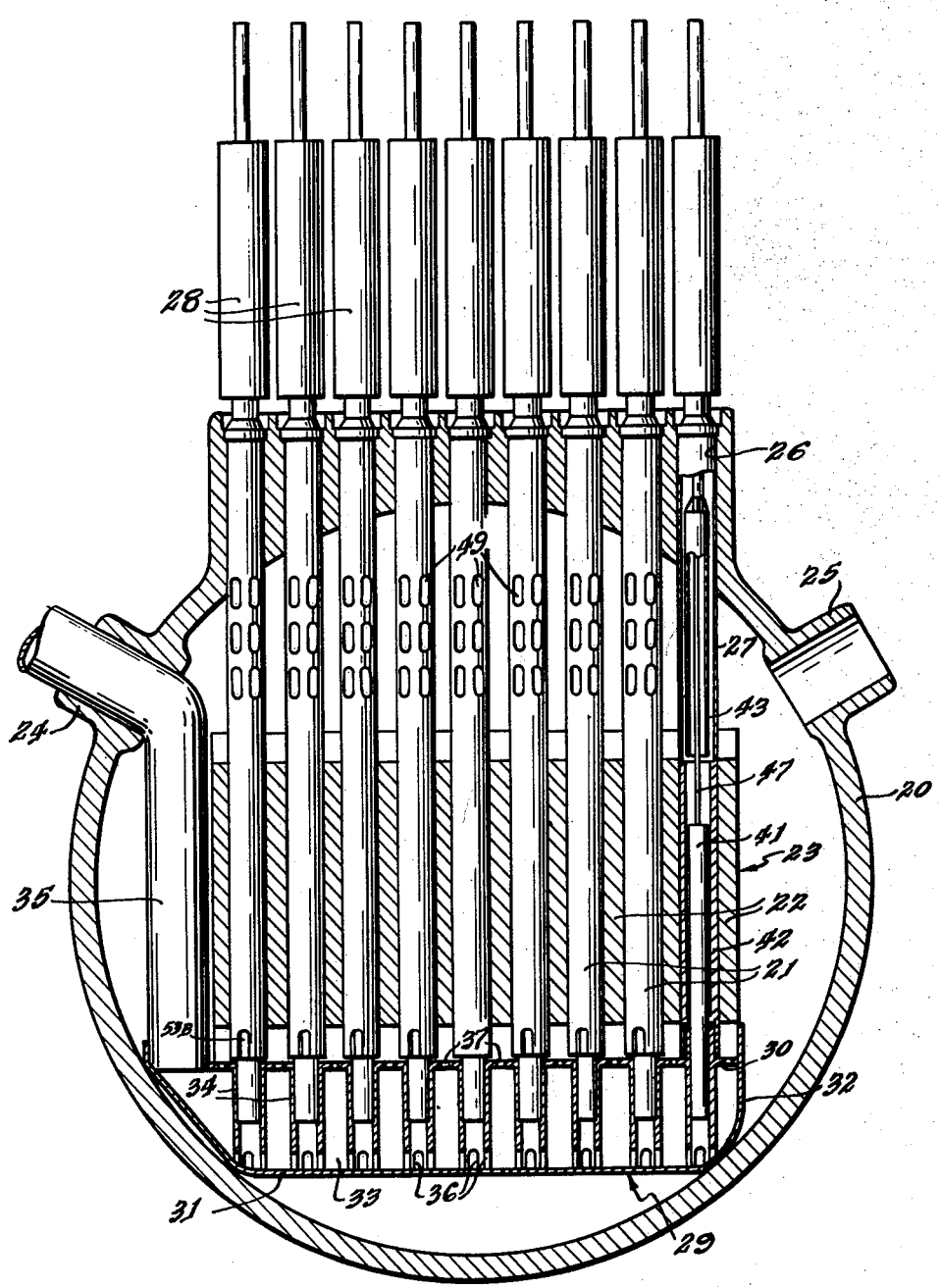
FIG. 1 is a vertical sectional view of a nuclear reactor constructed in accordance with the present invention.
Figure 2:
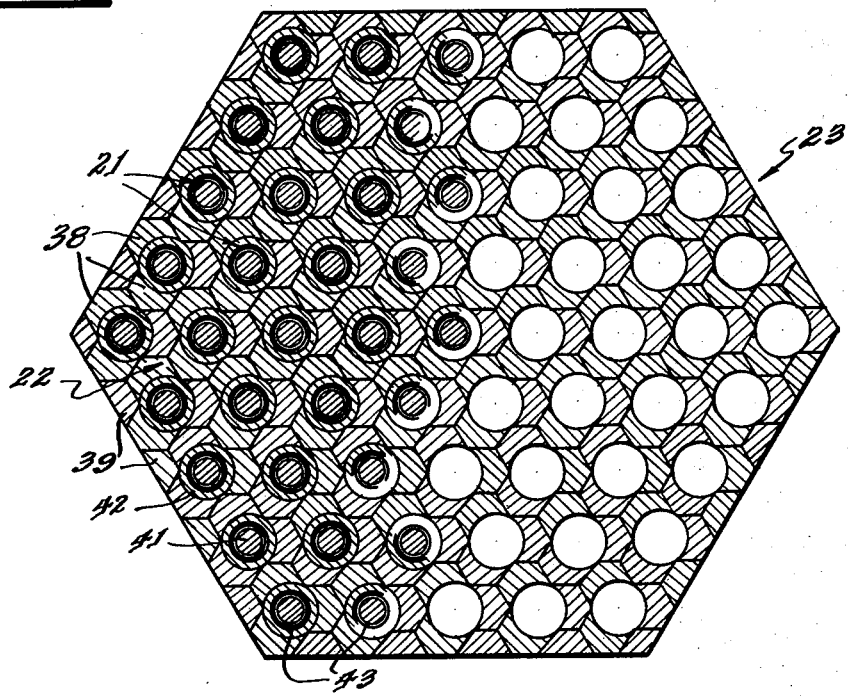
FIG. 2 is a diagrammatic horizontal sectional view taken through the reactor core.

As shown in FIGS. 1 and 2, the reactor of the present invention comprises a spherical pressure vessel 20 enclosing a plurality of separately critical seed cores 21 containing fissionable material disposed within a blanket 22 which contains fertile material to form active portion 23. Pressure vessel 20 is penetrated by one or more coolant inlet nozzles 24, one or more coolant outlet nozzles 25, and a plurality of refueling ports 26 all located above the top of cores 21. Core extensions 27 extend through refueling ports 26 to control mechanism housings 28.

Cores 21 are supported by a bottom plate assembly 29 which includes an upper plate 30, a lower plate 31, and a side wall 32, together defining an inlet plenum 33, and 61 stub tubes 34 which extend through and slightly above plate 30. Inlet duct 35 leads cooling water from inlet nozzle 24 to plenum 33 while apertures 36 in the lower portion of stub tubes 34 and apertures 37 in upper plate 30 permit the cooling water to enter active portion 23 as will be described in more detail hereinafter.

Pressure vessel 20 has an inside diameter of 24 feet, an over-all height of 28 feet 4 inches, and a shell thickness of 9 inches. Sixty-one seed cores 21 are distributed throughout blanket 22 in an equilateral-triangle lattice to form active portion 23. Active portion 23 is hexagonal in cross section and has an active height of 8 feet and a mean diameter of 15 feet.

The small height-to-diameter ratio of active portion 23 has the advantages of limiting core pressure drop and of reducing the potential for axial shifts of power. These proportions are well suited to the spherical pressure vessel which in turn provides minimum wall thickness, capability for rapid thermal transients and low susceptibility to radiation embrittlement. Cores 21 are approximately 14 inches in diameter and are spaced apart approximately 21 inches center to center.

Figure 3:
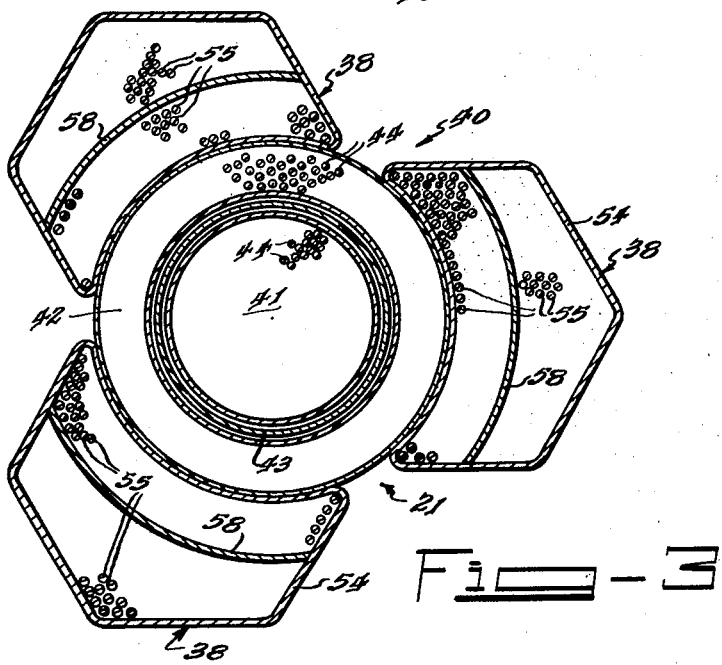
FIG. 3 is a horizontal sectional view taken through a single fuel module.

As shown in FIG. 2, blanket 22 is made up of a plurality of segments 38 shaped like a chevron except that the concave portion thereof is arcuate instead of angular. As shown in FIG. 3, three chevron-shaped blanket segments 38 are disposed symmetrically around each core 21 with the concave portion thereof adjacent to core 21. Blanket segments 38 nest together to form, with cores 21, essentially the entire active portion 23 of the reactor. However, filler blanket segments 39 of suitable size and shape are required around the edges of the active portion 23 to complete the hexagonal shape of the active portion. The reactor can be described in detail as an assembly of circular cylindrical seed cores 21 containing fissionable material, the cores being parallel to and spaced from one another, their axes forming a lattice composed of equilateral triangles, a plurality of blanket segments 38 having the same cross sectional area and shape throughout their length containing fertile material and filling in the spaces between the cores 21, each core 21 being directly surrounded by three segments 38, each segment 38 consisting of four straight sides and a fifth concave arcuate side, the four straight sides forming three internal angles of about 120°, the radius of the core, the radius of the arcuate side, the width of each of the two straight sides spaced from the arcuate side, and the distance from the arcuate side to the corner formed by the said two straight sides being about equal to one third of the length of the side of the equilateral triangle of the lattice on which the axes of the cores are located, the arcuate sides of the three segments directly surrounding a given core being directly adjacent the exterior of each core.

It will be apparent that active portion 23 is made up for the most part of a plurality of repeating units or modules 40 each consisting of a seed core 21 and the three blanket segments 38 immediately surrounding the core.

As shown in FIG. 3, core 21 includes an inner movable solid section 41 and an outer fixed annular section 42. The sections 41 and 42 are radially spaced to provide room for an annular safety element 43 containing a material of high neutron captive cross section.

Each of the core sections 41 and 42 comprises a plurality of closely spaced parallel elongated cylindrical rods 44. Except for its jacket, each rod 44 is formed of fertile material alone or of fertile material and fissionable material. Reference is now made to FIGS. 10, 11, and 12, in which fertile material and fissionable material are designated by reference characters 45 and 46, respectively. Each of the rods at the center of the inner core section 41 is made up of fertile material 45 alone. Each of the rods of the balance of inner core section 41 has an upper portion of fertile material 45 and a lower portion of fissionable material 46, the length of the upper fertile portion decreasing and the length of the lower fissionable portion increasing when considered from rod to rod in a radially outward direction. Each of the rods of the outer core section 42 has an upper portion of fissionable material 46 and a lower portion of fertile material 45, the length of the upper fissionable portion decreasing and the length of the lower fertile portion increasing when considered from rod to rod in a radially outward direction.

It is thus apparent that seed core 21 consists of an annulus of fissionable material which is surrounded by fertile material and contains fertile material at its center. By movement of inner core section 41 with respect to fixed core section 42, this annulus can be elongated or compacted to vary the amount of leakage from the annulus of fissionable material into the blanket of fertile material to control the reactor.

Referring now to FIGS. 4 to 6, core 21 will now be described in more detail. In these figures movable core section 41 is shown in its least reactive position corresponding to the position shown diagrammatically in FIG. 12 and safety element 43 is shown in withdrawn position. Solid core section 41 is moved by means of control mechanism (not shown) located within mechanism housing 28 operating through rod 47. In its fully lowered position movable core section 41 extends into stub tube 34 to a point just above the top of apertures 36 therein. Safety element 43 is moved by means of a control mechanism (not shown) located within mechanism housing 28 operating through sleeve 48 surrounding operating rod 47.

As shown in these figures core extension 27 has coolant ports 49 therein and includes a flange 50 at the top thereof by which fixed core 42 is supported from refueling ports 26. Also safety element 43 is open at the top and attached to operating sleeve 48 by spider 51. Shown in FIG. 5 is a slanting baffle 52 which directs coolant water coming from fixed core section 42 through openings 53 in the outer casing of fixed core section 42. Also shown in FIG. 5 is a fixed core section bottom extension 53A which has openings 53B in its outward face and rests on plate 30.

Referring now to FIGS. 7 and 8, blanket segments 38 include a casing 54 having the shape of two rhomboids placed side by side except that the concave portion is curved instead of angular. Casing 54 may also be described generally as having the shape of a chevron. Each of blanket segments 38 includes a plurality of closely spaced, parallel, elongated, cylindrical rods 55 extending between a lower imperforate support plate 56 and an upper guide grid 57. A curved partition 58 extends across blanket segment 38 to a point just above support plate 56 dividing blanket segment 38 into two regions. Also blanket casing 54 has a cutaway portion 59 in the concave face of the casing above guide grid 57 and a cutaway portion 60 in the concave face of the casing below support plate 56. Finally a core handling slot 61 is provided in casing 54 near the top thereof.

The flow pattern of coolant within the reactor will next be described with particular reference to FIGS. 1 and 9 of the drawing. All of the coolant flow enters inlet plenum 33 through inlet duct 35. 40% of this flow passes through apertures 36 into stub tubes 34 and makes a single pass through movable core sections 41. The remainder of the flow passes through apertures 37 and cutaway portions 60 of blanket segments to outer bottom extension 53A of annular core sections 42 through openings 53B. After making one pass through annular core sections 42 the water is directed through openings 53 and 59 by baffle 52 into the upper portion of blanket segment 38. It then makes two passes down on one side of partition 58 and up on the other side through blanket segment 38. This arrangement is possible because the blanket requires less coolant flow than the seed and because the pressure-drops for the one pass through the movable core section 41 and the three passes through the annular core section 42 and the blanket segment 38 are nearly the same.

An alternative core arrangement is shown in FIG. 13. This modification includes a plurality of separately critical seed cores 65, each including a central movable core section 66, an outer annular fixed core section 67, an annular control element 68 designed to be moved longitudinally between fixed core section 67 and movable core section 66 and a plurality of blanket segments 69. It will be observed that the relative proportions of seed core and blanket is different from that of the first embodiment previously described and that while the blanket segments 69 may still be described as chevron-shaped they are quite thin with the point of the chevron being removed to accommodate an adjacent seed core. This arrangement offers some advantages in that it provides a flatter power distribution and offers some control advantages over the arrangement described above. However, the preferred embodiment provides the more attractive mechanical design in that the movable fuel assembly and the safety element are both smaller in diameter and lighter in weight, so that multiple coolant passes are more readily accommodated.

Because the materials are immediately available, highly enriched uranium dioxide consisting predominantly of uranium–235 is preferred as the fissionable material and thorium dioxide consisting entirely of the fertile isotoye thorium–232 is preferred as the fertile material. According to calculations a reactor constructed as described above and employing these materials can be operated at full power for 70,000 hours or approximatvely 10 years without refueling. No other power reactor is known which has a core lifetime approaching 10 years. It is the combination of a large number of small highly enriched seed cores containing fissionable material and a blanket of a fertile material which is substantially free of fissionable isotopes together with control means which do not waste neutrons which make such a result possible.

In a seed and blanket reactor incorporating highly enriched uranium as seed material and thorium as blanket material, essentially all reactivity is derived from the separately critical uranium seed cores at the start of operation since thorium contains no fissionable isotopes. It is essential that each seed core be separately critical since there is little or no coupling between them. As the reactor operates, the fissionable material in the seed burns out and less power is produced therein. Compensating for this loss of power in the seed is a build-up of power derived from the blanket. Leakage of neutrons from the seed into the blanket converts thorium–232 into uranium–233 which is fissionable by thermal neutrons. Further leakage of neutrons from the seed into the blanket results in the fissioning of uranium–233 atoms in the blanket. Thus the blanket is driven by the seed to produce an appreciable fraction of reactor power. From zero power at the start of operation, the amount of power derived from the blanket increases to about 65% of the total near the end of reactor lifetime. On the average about 50% of the power is derived from the blanket during the life of the reactor.

It must be emphasized that this result cannot be attained using natural uranium in the blanket. In a reactor incorporating natural uranium as blanket material, in appreciable fraction of the reactor power is derived immediately from the blanket due primarily to fissioning of the uranium–235 content of natural uranium. This means that a pronounced shift in power recovery from core to blanket does not occur in a reactor incorporating a natural uranium blanket as it does in a reactor incorporating a thorium blanket. Thus the power derived from the blanket of a natural uranium reactor does not build up sufficiently to compensate for the loss of power in the core.

While a reactor incorporating a natural uranium blanket has many advantages, the lifetime of the seed core in such a reactor does not approach that of the reactor disclosed herein. In the Shippingport Pressurized Water Reactor, for example, the core lifetime is in the order of 10,000 EFPH (estimated full power hours) as compared to 70,000 EFPH for the reactor disclosed and claimed herein. The energy cost of power derived from the described reactor is significantly lower than that from a uranium converter-burner. The fuel cost from the uranium converter-burner (allowing for plutonium credit) is about 2.3 mills/kwh. while that for the thorium converter-burner is 1.8 mills/kwh. (allowing for uranium–233 credit).

In operation the reactivity of the reactor is low at the outset of operation. Therefore the movable seed is set at the position of maximum reactivity. After about 20,000 to 30,000 hours the reactivity has increased to its maximum at which time the movable seed is set at a position of relatively low reactivity. The reactivity then again goes down till at the end of about 70,000 hours the movable seed is set again at the position of maximum reactivity.

It is to be noted that a reactor incorporating a single seed core of enriched uranium surrounded by a blanket of thorium does not have the long life-time characteristic of a reactor constructed according to the present invention. In order to attain this long lifetime, the reactor must be a large one incorporating a relatively large number of small separately critical seed cores distributed uniformly in the blanket. In the specific embodiment shown above 61 such separately critical fuel modules are employed. Any number of fuel modules greater than 61 could be employed but the number could not be very much less than 61 and still retain the long seed lifetime.

A reactor incorporating a single seed core or a relatively small number of seed cores does not show this long lifetime because of insufficient coupling between seed and blanket. In other words in such as reactor the rate of conversion of thorium to uranium–233 in the blanket would not be sufficient to compensate for the loss of reactivity in the seed due to fuel depletion and accumulation of fission products. If these seed cores are small as in the reference design there is not sufficient fissionable material in the reactor to support high power operation over a long period of time. If the amount of fissionable material in the seed cores is increased, there will not be enough build up of fissionable material in the blanket to compensate for the loss of reactivity in the core because the shift in power from seed to blanket would not occur.

It is, of course, essential to obtain a long core lifetime that a large excess of fuel be provided. A limitation on increasing fuel inventory is the need to supply reactivity control which will shut down the reactor at any time, According to the present design each seed core is relatively small and has a relatively small amount of excess reactivity. This design lends itself to control by changing geometry which is inherently more economical of neutrons than is conventional absorber control. A high power reactor incorporating a single or small number of seed cores must be controlled by conventional control rods since it is not practical to develope a system employing changing geometry only for such a reactor because of the large amount of excess reactivity in each seed core. Since many of the neutrons produced in the seed cores would be wasted by capture in a nonproductive absorber and not escape to the blanket, insufficient uranium–233 would be produced in the blanket to compensate for loss of reactivity in the seed. Accordingly such a reactor would have a relatively short life compared to the reference design.

It has accordingly been shown that an unenriched fertile material must be employed in the blanket along with a highly enriched fissionable material in the seed and that a relatively large number of small, separately critical seed cores must be uniformly distributed in the blanket. As has previously been stated, it is also essential to attain maximum lifetime that control means be provided for the reactor which is not wasteful of neutrons. The reactivity variation of the described reactor during its lifetime is small—about 11% or less—which is controllable by the system to be next described.

According to this invention the reactor is controlled by changing the geometry of the reactor to control the leakage of neutrons from the seed into the blanket. The present reactor lends itself to such a control system because each seed core is relatively small, has a relatively low amount of excess reactivity, and is completely surrounded by blanket material.

According to this invention a central core section is moved longitudinally with respect to an annular core section surrounding the central core section. The central core section consists of an annulus of fissionable material surrounding a central blanket of fertile material. The length of the fissionable material seed is staggered in both the movable and fixed seed regions. This procedure both changes the moderator to fuel ratio within the core and also stretches or elongates the core on the one hand or compacts the core on the other. When the annular core is moved away from its most reactive position the elongation of the core makes it more probable that a neutron born in the core will escape from the core into the blanket surrounding the core or the blanket material at the center of the core. Since essentially all neutrons escaping from the seed core are captured in the blanket where they either produce fissionable material or cause fissions in the fissionable material previously produced, the control system wastes few neutrons.

While sufficient control could be obtained by simply dropping the seed cores out of the active portion of the reactor, the resulting axial power distribution would be unacceptable. This follows because criticality would occur with the seed only partially inserted and thus essentially all the core power would be produced within a relatively small fraction of the core volume. Programming the insertion of seed cores over the entire reactor would result in only small improvements in power distribution due to the extremely poor coupling between adjacent seed cores.

According to this invention however only a portion of the seed core is moved axially in and out of the active portion of the reactor, this being the central portion of the seed core. The rods at the center of this central portion of the seed core are formed of fertile material alone; the rods of the remainder of the central portion of the seed core have an upper portion of fertile material and a lower portion of the fuel material; and each of the rods of the outer, fixed portion of the seed core has an upper portion of fissionable material and a lower portion of fertile material. The length of the upper portion of these rods decreases and the length of the lower portion increases when considered from rod to rod in a radially outward direction. Thus the boundary between fissionable and fertile material is slanted or stepped in toward the center of the seed core from top to bottom of the seed core. Reference to FIGS. 10–12 of the drawing makes it obvious that movement of the central portion of the seed changes the radial dimensions of the seed in a smooth fashion in addition to moving a portion of the seed in or out of the active portion. The change in reactivity occurring as a result of movement of the central portion of the seed core is relatively uniform and is distributed over a major portion of the reactor height. This system results in control swings comparable to those which could be obtained by moving all the seed cores out of the active portion but avoids the extremely poor power distribution which would result from such a system. The system also results in power distributions at least as good and probably better than those which could be obtained with a more conventional poison control system. Thus the benefits of leakage control are obtained without a penalty in power distribution.

It will be noted that the movable portion of the seed core is longer than is the fixed portion although the length of seed material is the same. The extension of fertile material prevents loss of neutrons in the central opening in the fixed core when the movable core is partially withdrawn from the active portion.

It is also to be particularly noted that the fissionable material in the seed core is distributed in an annulus surrounding and enclosed by fertile material. This arrangement has the advantage of lower reactivity at the start of operation of the reactor over a solid seed of fissionable material. While the reactivity is also lower near the end of operation the decrease in reactivity is not as marked near the end of operation as it is at the beginning. It is desirable to have reduced reactivity at the begining of operation since it is desirable to have reactor just critical with the maximum possible seed volume in the core at the begining of operation. This follows because nearly all the power is generated in the seed at the beginning of core life. Thus provision of a central blanket reduces reactivity more at the beginning of core life than later on in core life.

With a fuor-foot movement of the movoble core, the described control system is sufficient to shim reactivity over the lifetime of the seed. It also provides enough control to compensate for xenon and samarium. It is not yet clear whether it provides adequate cold shutdown at the most reactive time of core life. If necessary, the distance the movable seed can be moved can be increased, or the safety elements can be relied on as for cold shutdown.

To sum up this discussion of the control of the reference reactor it is noted that this is the only control system known to date which will satisfy all control requirements in a large, pressurized water, uranium-seed, thorium blanket power reactor. Use of this system improves fuel utilization without penalty, either in loss of neutrons in poison material or in increased leakage from the reactor.

Also of importance is the particular configuration of the fuel modules employed herein since this makes possible easy replacement of fuel or blanket material if necessary. By employing a central cylindrical seed core surrounded by three-chevron shaped blanket segments, it is possible to remove one or more modules at a time without difficulty. To accomplish this the seed core itself can be lifted directly through the refueling port after which each blanket segment is moved to the center and then lifted through the refueling port. It will be noted that the width of the blanket segments is such that it can be moved into the center of the module between the other two blanket segments.

This core arrangement has the following advantages.

(1) High blanket power fraction.
(2) Relatively flat power distribution.
(3) Capability for providing any desired power output, by merely combining the proper number of standardized modules.
(4) Capability for simple through-the-head refueling.
(5) Relatively small number of pieces.

The following table gives the important reactor parameters.

TABLE

Reactor Core Parameters

| | |
|---|---:|
| Reactor power, mw. (th) | 1,720 |
| Pressure, p.s.i.a. | 2,000 |
| Reactor inlet temp., °F. | 515 |
| Pressure at turbine throttle, p.s.i.g. | 600 |
| Pumping power, percent of gross | 4.4 |
| Coolant flow rate, $10^6$ lbs./hr. | 120 |
| Core pressure drop, p.s.i. | 50 |
| Active portion: | |
|    Diameter, ft. | 15 |
|    Active height, ft. | 8 |
|    Average power density, kw./liter | 42 |
| Seed: | |
|    Volume percent of active portion | 30 |
|    Power density, kw./liter [1] | 140 |
|    M/W ratio | 0.7 |
|    Rod diameter, in. | 1/4 |
|    Rod spacing, in. | 3/32 |
|    Equivalent full length rods | 50,000 |
|    Fuel loading, kg. $U^{235}$ | 4,500 |
|    Seed lifetime, EFPH | 70,000 |
|    Average depletion, $10^{20}$ f./cc. | 22 |
|    No. of seeds/blanket | 1 |
| Peak depletion $10^{20}$ f./cc. | 30 |
| w/o $UO_2$ in seed fuel | 35 |
| Blanket: | |
|    Blanket material | $ThO_2$ |
|    Power density, kw./liter [1] | 33 |
|    Hydrogen/fuel, atom ratio | 4.5 |
|    Water/$ThO_2$ | 1.75 |
|    Rod diameter, in. | 5/8 |
|    Rod spacing, in. | 5/16 |
|    Total No. rods | 21,400 |
|    Loading, metric tons | 68 |
|    Blanket lifetime, EFPH | 70,000 |
|    Average depletion, mw. d./m.t.f. | 36,500 |

[1] At maximum power fraction.

It is also understood that the invention is not to be limited by the details given herein but that it may be modified within the scope of the appended claims.

The embodiments of the invention in which an exclusive property or privilege is claimed are defined as follows:

1. An assembly comprising a circular cylindrical core containing fissionable material and three cylindrical segments containing fertile material being symmetrically placed around the core, said segments approximating the shape of a chevron, the width of each segment being less than the diameter of the core and the thickness of each segment being not greater than the radius of the core.

2. A nuclear reactor comprising a plurality of the assemblies of claim 1 nested together, together with filler assemblies, in a hexagonal assembly.

3. An assembly comprising a circular cylindrical core containing fissionable material, and three cylindrical segments containing fertile material and being disposed about and extending along the core, each segment consisting of four straight sides and a fifth concave arcuate side, the four straight sides forming three internal angles each of 120°, each of the two straight sides spaced from the arcuate side having a width about equal to the radius of the core, the radius of the arcuate side and the distance from a midpoint of the arcuate side to the corner formed by the said two straight sides being about equal to the radius of the core, the arcuate side being directly adjacent the core.

4. An assembly comprising a plurality of circular cylindrical cores containing fissionable material, the cores being parallel to and spaced from one another, their axes forming a lattice composed of equilateral triangles, a plurality of cylindrical segments containing fertile material and filling in the spaces between the cores, each core being directly surrounded by three segments, each segment consisting of four straight sides and a fifth concave arcuate side, the four straight sides forming three internal angles each of about 120°, the radius of the core, the radius of the arcuate side, the width of each of the two straight sides spaced from the arcuate side, and the distance from the arcuate side to the corner formed by the said two straight sides being about equal to one third of the length of the side of the equi-lateral triangle of the lattice on which the axes of the cores are located, the arcuate sides of the three segments directly surrounding a given core being directly adjacent the exterior of the core.

No references cited.